United States Patent [19]
Grossman et al.

[11] Patent Number: 5,982,790
[45] Date of Patent: Nov. 9, 1999

[54] SYSTEM FOR REDUCING PULSE-TO-PULSE ENERGY VARIATION IN A PULSED LASER

[75] Inventors: William Mark Grossman, Los Altos; Eduardo Yulis-Dobry, San Jose, both of Calif.

[73] Assignee: Lightwave Electronics Corporation, Mountain View, La.

[21] Appl. No.: 08/784,448

[22] Filed: Jan. 16, 1997

[51] Int. Cl.$^6$ ........................................... H01S 3/10
[52] U.S. Cl. ..................... 372/25; 372/69; 372/38; 372/10; 372/30
[58] Field of Search ................. 372/25, 38, 69, 372/10, 29, 30

[56] References Cited

U.S. PATENT DOCUMENTS

| | | | |
|---|---|---|---|
| 5,128,601 | 7/1992 | Orbach et al. | 372/30 |
| 5,157,676 | 10/1992 | Wilcox | 372/29 |
| 5,226,051 | 7/1993 | Chan et al. | 372/30 |
| 5,303,248 | 4/1994 | Gibbs | 372/25 |
| 5,339,323 | 8/1994 | Hunter et al. | 372/25 |
| 5,365,532 | 11/1994 | Klaras et al. | 372/31 |

*Primary Examiner*—Leon Scott, Jr.
*Attorney, Agent, or Firm*—Lumen Intellectual Property Services

[57] ABSTRACT

A system and method for reducing pulse-to-pulse energy and peak power variation in various types of pulsed lasers, and in Q-switched lasers in particular. The system of invention has a laser cavity with a lasing medium pumped by a pumping device for delivering to the medium a pumping energy $E_{pump}$. The system further includes a detection device and circuitry for determining the pulse magnitudes $M_i$ of laser pulses i, such as peak pulse amplitudes $A_i$, pulse energies $E_i$, pulse widths $W_i$ or other pulse metrics. According to the method of invention, a feedback mechanism which is in communication with the pumping device ensures pulse-to-pulse stability by increasing the pumping energy $E_{pump}$ when pulse magnitude $M_i$ of laser pulse i exceeds a mean pulse magnitude [M] and decreasing the pumping energy $E_{pump}$ when $M_i$ is less than [M]. Alternatively, the feedback mechanism is in communication with the switching device which controls that variable loss factor of the Q-switch. Pulse-to-pulse peak and energy stability is achieved by decreasing the variable loss factor when $M_i$ of pulse i exceeds the mean [M] and increasing the variable loss factor when $M_i$ of laser pulse i is less than [M].

46 Claims, 5 Drawing Sheets

SYSTEM FOR REDUCING PULSE-TO-PULSE ENERGY VARIATION IN A PULSED LASER

FIELD OF THE INVENTION

This invention relates generally to controlling the energy variations in pulsed lasers. More particularly, it relates to a system implementing a feedback method to achieve reduction in pulse-to-pulse energy variation at high repetition rates.

BACKGROUND OF THE INVENTION

The use of lasers in the fields of communications, medicine and machining is increasing steadily. Continuing progress in these areas imposes ever more stringent requirements on the laser devices themselves and their control mechanisms. Especially high demands are placed on high-repetition laser systems employed in trimming, annealing, surface texturing, cutting, welding, melting, photodepositing, photodissociating, photopolymerization and surgical procedures. In all these applications the processing quality depends greatly on the pulse-to-pulse energy stability and pulse-to-pulse peak power (which is equivalent to "amplitude") stability of the laser system.

Typically, laser pulsing is achieved by various Q-switching techniques. At high repetition rates the temporal separation between the pulses is on the order of, or less than, the time required to restore or pump the lasing medium. This means that the repetition rate approaches or exceeds the inverse of the effective storage time $1/\tau$ of the laser medium. In this frequency regime there is less energy stored per pulse and the laser is closer to threshold at the start of each pulse as compared with low repetition rate operation. As a result, the pulse-to-pulse energy stability in this frequency regime is negatively affected.

One approach to solving the problem of initial variability or transience in mean energy pulse stability is presented by Gibbs in U.S. Pat. No. 5,303,248. Gibbs proposes to treat the turn-on transience by negative feedback as used in pulse-width modulation of diodes. This does allow the laser to quickly reach the regime of desired power level per pulse, but does not equalize pulse-to-pulse energy or peak power fluctuations once operation near the desired output level is established.

In the past many techniques have relied on simply attenuating the output pulse train in a time-varying manner to a preset level to remove pulse energy variability. This solution incurs many losses due to the additional elements required and, of course, the energy dumped in the attenuation process itself. Examples of systems implementing a common attenuation technique for achieving pulse-to-pulse energy stability are presented by Wilcox in U.S. Pat. No. 5,157,676.

In U.S. Pat. No. 5,128,601 Orbach discloses a method for stabilizing laser pulses based on an external control or pump control and a compiled table of peak pulse energies. The pulses are effectively attenuated by the control based on the look-up table. This approach is empirical and works only if the laser is pre-calibrated with a statistically significant number of pulses at various time intervals or pulse rates. It is important to realize that this approach does not produce a direct, pulse-to-pulse control for a laser operating at any fixed repetition rate. Moreover, the method can not be applied directly to any given laser and does not involve a direct feedback loop.

Another solution to the problem is advanced by Klaras et al. in U.S. Pat. No. 5,365,532. The inventors disclose how to stabilize the amplitude of a Q-switched laser by cavity dumping. The technique does not gather information about the previous pulse to correct the next. In fact, it is simply concerned with eliminating the intrinsic jitters in the signal. Furthermore, the method is not specifically suited for high-frequency applications.

In U.S. Pat. No. 5,339,323 Hunter et al. teach how to control the mean energy stability from pulse to pulse by adjusting the time between pulses. Such adjustments allow the medium to be properly pumped to a desired stored energy between pulses. In other words, the technique is founded on the realization that a sufficient build-up of flux from one pulse to the next must be allowed to take place. Now, the mean energy can be controlled. Unfortunately, at high repetition rates, e.g., on the order of or larger than the inverse of the effective storage time, i.e., $\geq 1/\tau$, it is impossible to perform adjustments by temporal shifting of pulses. Therefore, this technique can not be used in the regime of high pulse repetition rates.

The dynamics of Q-switched lasers are well-known to persons skilled in the art. Pulse stability has been improved using injection seeding, intra-cavity etalons and other means. These approaches have benefits, but also drawbacks. Injection seeding is costly and complex. Etalons often induce power losses and can be sensitive to alignment and temperature, thus affecting laser performance.

In U.S. Pat. No. 5,226,051 to Chan et al. disclose how to equalize pulses in a Q-switched laser at different repetition rates in an open-loop system. In this arrangement information from a pulse is not used to predict or control the parameters of a subsequent pulse. Instead, the pump power to a given pulse is varied so that after a predetermined time a fixed amount of energy is stored in the laser medium. This method does reduce pulse variation with changes in repetition rate, but does not reduce the pulse-to-pulse variability at fixed repetition rates.

In view of the state of the art, there is a need for a pulse-to-pulse energy equalization system and method tailored specifically to pulsed lasers, such as Q-switched devices. The envisioned system should react quickly and take into account the non-linearities encountered in the repetition rate domain on the order of or greater than the inverse of the effective storage time $(1/\tau)$. Furthermore, the performance of the laser should not be impaired as a result.

OBJECTS AND ADVANTAGES OF THE INVENTION

Accordingly, it is a primary object of the present invention to reduce the pulse-to-pulse peak power and energy variations in pulsed lasers operating at high repetition rates. This reduction is to be achieved in lasers including Q-switched devices at repetition rates on the order of the inverse of the effective storage time $1/\tau$ of the lasing medium and significantly higher than $1/\tau$.

Another object of the invention is to achieve the reductions in the pulse-to-pulse variations by a cost-effective system and a method which does not impair the performance of the laser.

Furthermore, it is another object of the invention to adapt it to different types of lasers, such as solid state and gas lasers, utilizing various types of pumping arrangements. Thus, the system and method of invention should cover a wide range of wavelengths and be practical in many types of lasing media.

Yet another object of the invention is to achieve the pulse-to-pulse energy and peak stability with a feedback applied to either the pumping device or the switching device, e.g., the Q-switch.

Finally, it is an object of the invention to attain pulse-to-pulse stabilization fulfilling the requirements for many applications in the fields of communications, machining and medicine.

These and other objects and advantages will become more apparent after consideration of the ensuing description and the accompanying drawings.

SUMMARY OF THE INVENTION

The objects and advantages of the invention are attained by a system and method for reducing pulse-to-pulse energy variation in pulsed lasers, and in Q-switched lasers in particular. The system of invention has a laser cavity with a lasing medium pumped by a pumping device such as a laser diode or some other light source capable of delivering to the lasing medium a pumping energy $E_{pump}$. The system also includes a switching device, most commonly a loss inducing element, e.g., a Q-switch. The switching device, by periodically varying the cavity gain or loss, induces the lasing medium to emit laser pulses i.

The system further includes a detection device, e.g., a photodetector, which determines pulse magnitudes $M_i$ of laser pulses i. Pulse magnitudes $M_i$ are conveniently chosen pulse parameters which best characterize the size of the pulse in a particular application. In fact, the magnitude of any pulse i can be the peak pulse amplitude $A_i$, pulse energy $E_i$ or any other suitable pulse metric. It is understood that any of these specific pulse parameters can be used by the system and method of invention in achieving pulse-to-pulse stability.

A feedback mechanism in communication with the pumping device ensures pulse-to-pulse stability by increasing the pumping energy $E_{pump}$ when pulse magnitude $M_i$ of laser pulse i exceeds a mean pulse magnitude [M]. On the other hand, the feedback mechanism decreases the pumping energy $E_{pump}$ when pulse magnitude $M_i$ of laser pulse i is less than mean pulse magnitude [M].

Another way for the system of invention to achieve pulse-to-pulse stability is to provide a feedback mechanism in communication with the switching device. In this embodiment the switching means, which has a variable loss factor, is adjusted to ensure pulse-to-pulse peak and energy stability. In particular, the variable loss factor is decreased when pulse magnitude $M_i$ of laser pulse i exceeds mean pulse magnitude [M]. On the other hand, the variable loss factor is increased when pulse magnitude $M_i$ of laser pulse i is less than mean pulse magnitude [M].

In a preferred embodiment the system of invention also has a computing mechanism or circuit in communication with the detection device. The computing circuit calculates mean pulse magnitude [M] from pulse magnitudes $M_i$. For example, when pulse magnitudes $M_i$ are peak pulse amplitudes $A_i$ the detection device will include a peak detector and the circuit will process the peak pulse value. Alternatively, when pulse magnitudes $M_i$ are the energies $E_i$ the detection device will include an integrator and the circuit will process the integrated signal.

The system can be used in conjunction with many types of lasers, e.g., solid state lasers, gas lasers or liquid lasers. Most commonly, the lasing medium is a neodymium doped solid state host. Suitable solid state hosts can be selected from but are not limited to the group of materials consisting of Nd:glass, Nd:YAG, Nd:YLF, Nd:YAP, Nd:YVO$_4$ and Nd:SFAP. Some other suitable solid state lasing media include Er:glass and Yb:YAG. Of course, in the case of gas or liquid lasers the lasing medium is selected from among suitable gases or liquids.

The method of invention is practiced by inducing the lasing medium of the system to emit laser pulses i by using the switching device, e.g., a Q-switch, once the pumping mechanism has delivered to the lasing medium the pumping energy $E_{pump}$. Stability is ensured by increasing the pumping energy $E_{pump}$ when the pulse magnitude $M_i$ of laser pulse i exceeds the mean pulses magnitude [M], and decreasing the pumping energy $E_{pump}$ when pulse magnitude $M_i$ of laser pulse i is less than [M]. Alternatively, the switching device is adjusted to ensure pulse-to-pulse stability. In particular, the variable loss factor is decreased when pulse magnitude $M_i$ of pulse i exceeds [M]. On the other hand, the variable loss factor is increased when $M_i$ is less than [M].

According to the method of the invention, mean pulse magnitude [M] is calculated from pulse magnitudes $M_i$. This can be done by using all of the past magnitudes $M_i$ or a sample containing a number q of laser pulses i, where $q \geq 1$. Consequently, mean [M] can be a weighted average or a moving average.

The laser pulses i are emitted at a repetition rate ν on the order of or greater than the inverse effective storage time 1/τ of the lasing medium. In many applications this repetition rate will be constant.

In the preferred embodiment the pumping mechanism is a laser diode and pumping energy $E_{pump}$ for pumping the medium to enable emission of pulses i is delivered by applying corresponding diode currents $I_i$ to the diode. Under these circumstances, pulse-to-pulse energy and peak power stability is ensured by adjusting diode current $I_{i+1}$, which generates pulse i+1, by an adjustment current $\Delta I_{i+1}$. This will yield the proper current value for pumping the medium before pulse i+1. Adjustment current $\Delta I_{i+1}$ is calculated from a linear equation written as:

$$\Delta I_{i+1} = c \Delta M_i,$$

where c is a constant and $\Delta M_i$ represents the fractional fluctuation of pulse magnitude $M_i$ from the mean pulse magnitude [M].

The method of the present invention can be practiced with lasers emitting at wavelengths ranging from 0.7 to 10 μm, but is not restricted to this range. The method is very useful for applications in material processing. In particular, processing techniques such as trimming, annealing, surface texturing, cutting, welding, melting, photodepositing, photodissociating, photopolymerization and surgery stand to gain most from using the present method.

Furthermore, this technique is useful in controlling pulse-to-pulse fluctuations in power or energy for lasers where the output wavelength is shifted from the wavelength originally emitted by the lasing medium. This wavelength shift can occur inside or outside the pulsed laser cavity and may be performed using frequency summing or frequency difference methods well known in the art. Examples of suitable techniques include OPO and OPA. These can generate optical emissions ranging from the ultraviolet (<200 nm) to the infrared (>10 μm). In fact, it is even possible to use these wavelength shifted pulses in the feedback method of the invention.

A detailed description of the system and method of the invention is set forth below in reference to the drawing figures.

DETAILED DESCRIPTION OF THE PREFERRED EMBODIMENT

Figure 1:
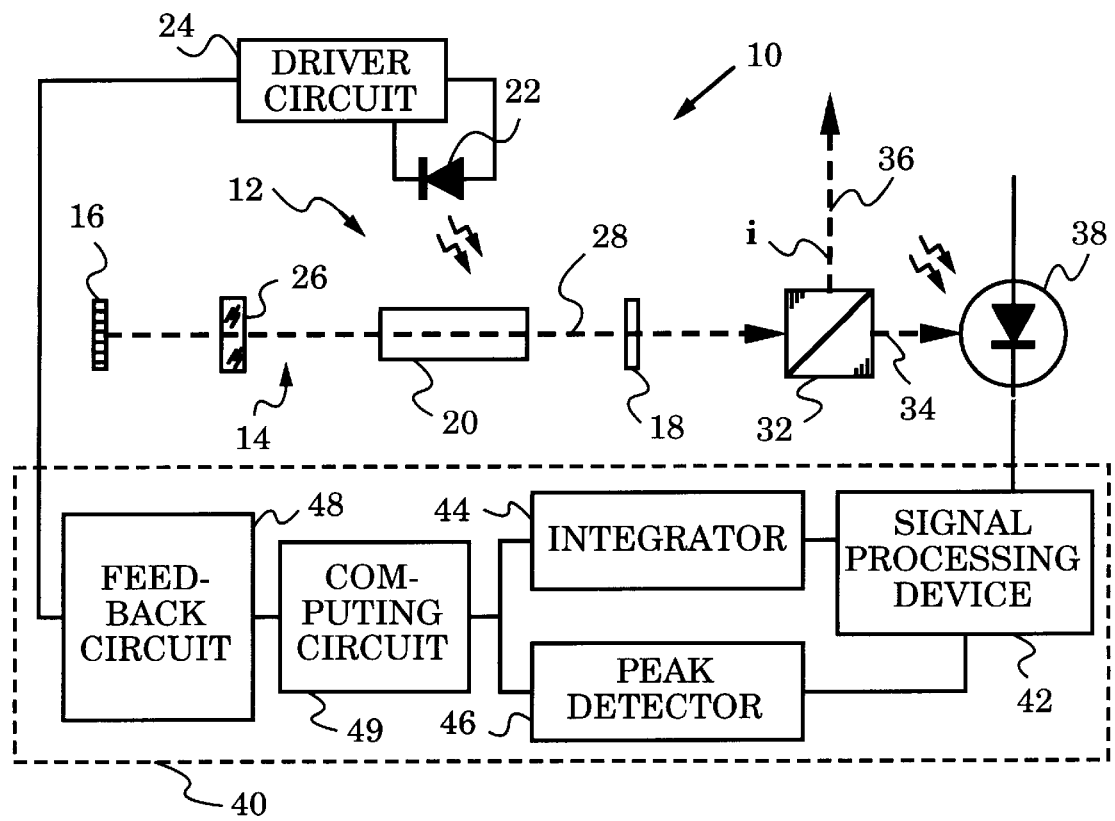
FIG. 1 is a block diagram of a preferred system for reducing pulse-to-pulse energy variations.

A preferred embodiment of a system 10 according to the invention is shown in FIG. 1. Here, a pulsed laser 12 has a lasing cavity 14 delimited by a high reflector 16 and an output coupler 18. Cavity 14 is of the Fabry-Perot type, since reflector 16 and coupler 18 are planar. It is understood that other cavity 14 configurations such as hemifocal, confocal or more complex geometries can also be used. A person with average skill in the art will know how to adapt a particular cavity to the present invention. It is preferable, however, that cavity 14 be stable and support the fundamental transverse mode of interest for the given application. That is because the fundamental mode, e.g., $TEM_{00}$, is most useful in many practical applications and pulses in this mode can be readily equalized.

A lasing medium 20 is positioned inside cavity 14. Preferably, medium 20 is a neodymium doped solid state host. Materials of this kind include Nd:glass Nd:YAG, Nd:YLF, Nd:YAP, Nd:YVO$_4$, Nd:SFAP and the like. Medium 20 can also be Er:glass, Yb:YAG, a gas, such as $CO_2$, or a liquid. In the preferred embodiment medium 20 is Nd:YAG operating in its fundamental transverse mode at a wavelength of 1,064 nm. The wavelength range, however, is not limited and can extend from 0.7 to 10 $\mu$m and beyond depending on medium 20 and any eventual nonlinear conversion technique.

Figure 5:
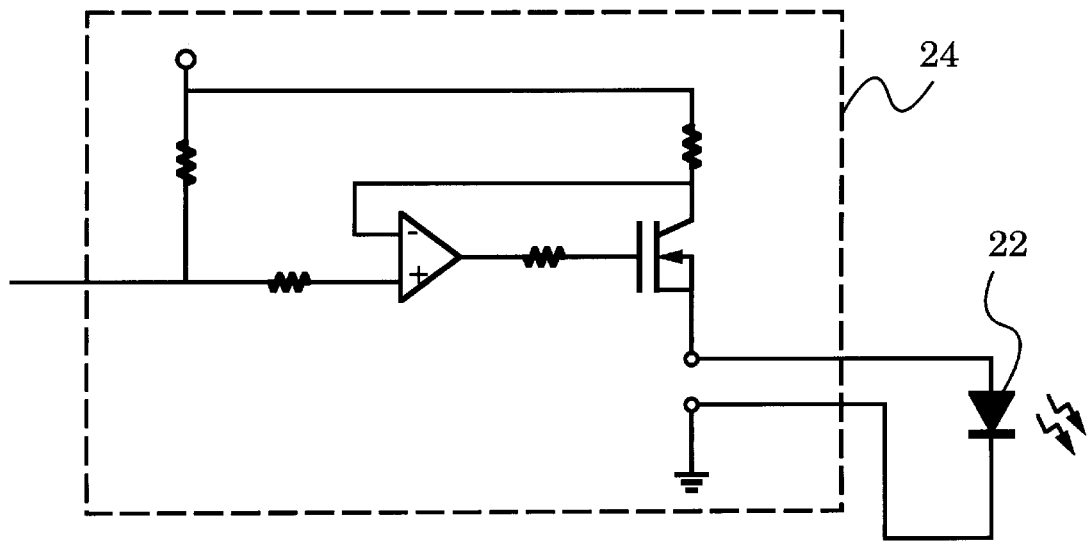
FIG. 5 is a circuit diagram of a laser diode driver circuit for pumping up the laser in the system of the invention.

A pumping mechanism 22, in this case a laser diode 22, is positioned next to medium 20. Diode 22 is controlled by a driver circuit 24 and, when on, causes population inversion. In other words, diode 22 pumps medium 20 by delivering a pumping energy $E_{pump}$ in the form of radiation. As is well-known, lamps and other pumping mechanisms can be used instead of diode 22 to deliver pumping energy $E_{pump}$ to medium 20. The arrangement of pumping mechanism 22 can conform to any geometry, e.g., end-pumping, side-pumping or a combination of end- and side-pumping. A circuit diagram of a suitable driver circuit 24 is illustrated in FIG. 5.

A variable loss inducing means or a switching mechanism 26 is also located inside cavity 14. Mechanism 26 pulses laser 12 by changing its loss characteristics. In the preferred embodiment mechanism 26 is a Q-switch. Acousto-optic, electro-optic, mechanical and other kinds of Q-switches are well known in the art and all can be successfully implemented in system 10. The essential requirement is that Q-switch 26 be sufficiently fast in changing its behavior from lossy to transmitting to ensure that the high repetition rates v discussed below can be attained.

Figure 2:
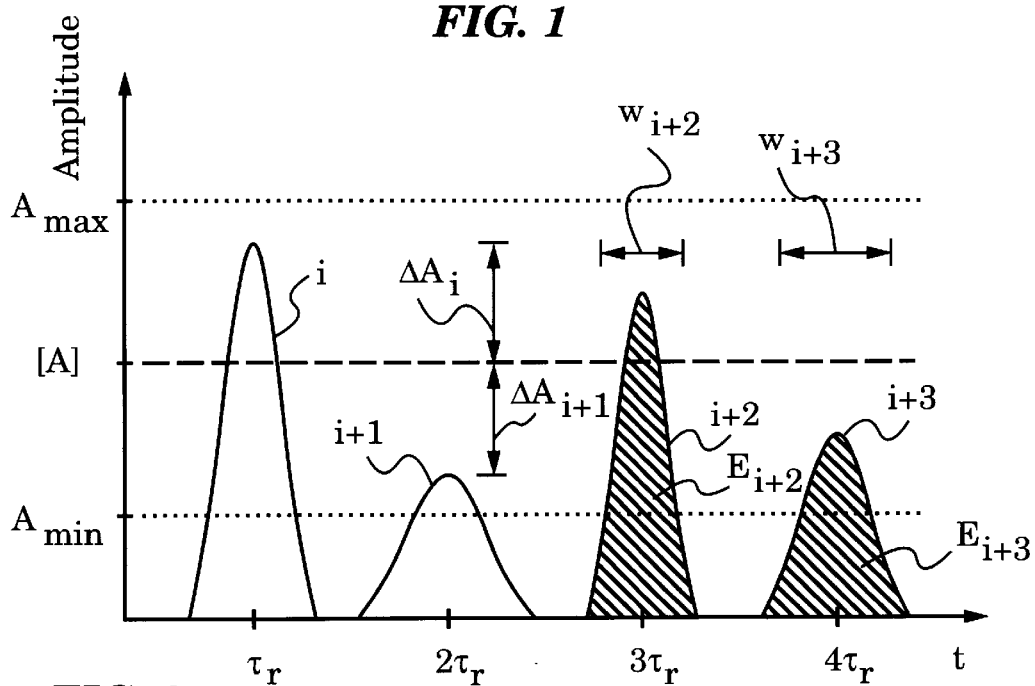
FIG. 2 is a graphical illustration of pulses emitted at high repetition rates.

A pulsed laser beam 28 issues from laser 12 through output coupler 18. Individual laser pulses i making up beam 28 are illustrated in FIG. 2 and addressed below. A beam divider or splitter 32 separates beam 28 into a test beam 34 and a working beam 36. The latter is deflected upwards and delivered to a working site (not shown). Meanwhile, test beam 34 is transmitted through splitter 32 to a detection mechanism 38. The transmission characteristics of splitter 32 are known and stable.

Although splitter 32 enables one to derive copies of pulses i to determine pulse magnitudes $M_i$ in a straightforward manner, any other optical arrangement for obtaining copies of pulses i may be suitable. A person with average skill in the art will be able to implement the most convenient method of deriving replicas of pulses i generated in beam 28 for feedback purposes according to the invention.

A detection mechanism 38, ideally a photodetector, intercepts test beam 34. Photodetector 38 generates a response signal indicative of the magnitude, e.g., amplitude or energy, of each pulse i received in test beam 34. The output of photodetector 38 is connected to a control circuitry 40. A signal processing device 42, e.g., an amplifier, is arranged first in control circuitry 40. Device 42 is preferably a high-precision, linear response amplifier accompanied by a filter set for the bandwidth of pulses i.

An integrator 44 and a peak detector 46 are connected to the output of device 42. Either integrator 44 or peak detector 46 or both can be used in analyzing pulse magnitudes $M_i$ of pulses i, depending on the magnitude(s) selected. Integrator 44 integrates the strength of the signal delivered to it over time, i.e., it integrates the pulses to detect pulse energies $E_i$. Therefore, integrator 44 is used when pulse magnitudes $M_i$ to be analyzed are the pulse energies $E_i$.

Peak detector 46 memorizes the signal or the peak of any pulse i. Thus, detector 46 is used when pulse magnitudes $M_i$ to be analyzed are the peak pulse amplitudes $A_i$. A feedback circuit 48 and a computing circuit 49 are connected to both integrator 44 and peak detector 46.

Figure 4:
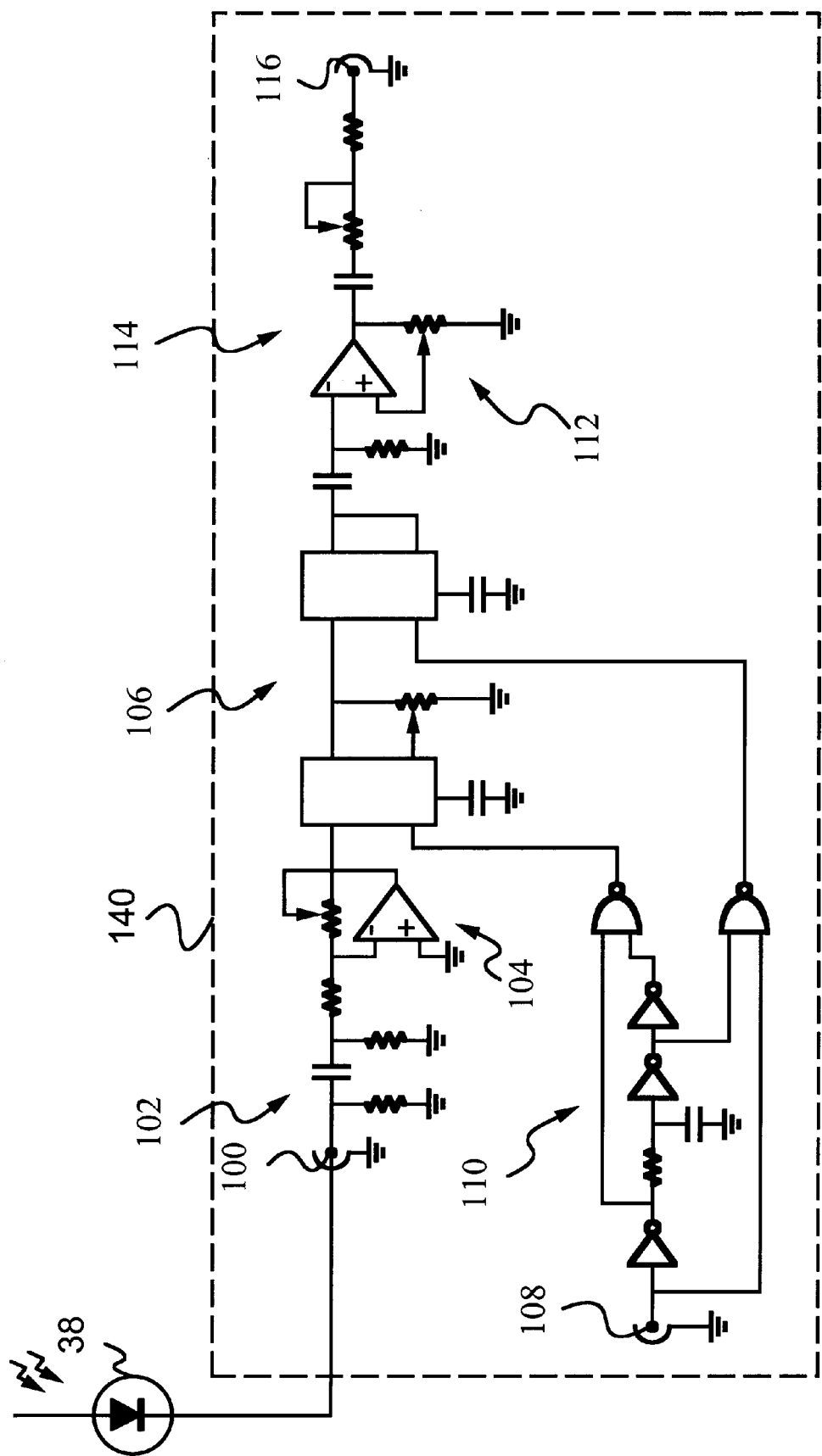
FIG. 4 is a circuit diagram of a feedback circuit used in the system of the invention.

An example diagram of circuitry 40 is represented in diagram 140 of FIG. 4. In fact, diagram 140 shows the specific electrical components of circuit 40 but in a simplified arrangement without integrator 44 and without computing circuit 49. This example circuitry of diagram 140 is designed to measure peak pulse amplitudes $A_i$ and subtracts the mean value from A.

The signal from photodetector 38 is passed to input 100 and filter 102. An operational amplifier 104 then inverts and amplifies the signal and passes it on to a sample and hold circuit 106. Thus, input 100, filter 102 and amplifier 104 represent signal processing device 42 of FIG. 1.

A trigger input 108 with circuit portion 110 is used to deliver to sample and hold circuit 106 signals which are used to ensure comparison of just the peak values. In other words, sample and hold circuit 106 is set up to look at the peak pulse amplitudes $A_i$ in a continuous comparison mode and neglect other parts of the signals. Trigger input 108 with circuit portion 110 and sample and hold circuit 106 thus represent peak detector 46 of FIG. 1.

A gain adjustment 112 and a filter 114 are used to generate and deliver to a driver input 116 a modulation control signal for driver circuit 24. Adjustment 112, filter 114 and driver input 116 thus correspond to feedback circuit 48 of FIG. 1. Additional circuitry (not shown) may be included to continuously compute from peak pulse amplitudes $A_i$ a mean peak pulse amplitude [A] and to store this value. This additional circuitry corresponds to computing circuit 49 of FIG. 1 and it could be connected to gain adjustment 112 to regulate the gain. On the other hand, if mean amplitude [A] is known in advance it is sufficient to adjust the amplification of gain adjustment 112 manually, as provided for in diagram 140.

Clearly, diagram 140 is non-unique and many other circuits capable of performing the same functions can be devised. Therefore, for clarity, the remaining discussion will refer back to general circuitry 40 and its components as shown in FIG. 1. Feedback circuit 48 derives from mean pulse amplitude [A] a fractional fluctuation $\Delta A_i$ for any given pulse amplitude, in this case amplitude $A_i$ of pulse i. This fractional fluctuation is expressed by the following equation:

$$\Delta A_i = ((A_i) - [A])/[A].$$

Mean amplitude [A] can be calculated from all previous amplitudes $A_i$ or from a sample of q amplitudes selected from among previous amplitudes $A_i$. The choice is up to the designer of system 10. In the second case, a number q ($q \geq 1$) of amplitudes $A_i$ can be used to derive mean amplitude [A]. Of course, once laser 12 of system 10 has achieved a sufficient degree of stability (i.e., after turn-on transience), using a larger sample (larger q) will result in a more reliable mean amplitude [A]. Technically, mean [A] is thus calculated as a moving average. It should be noted, however, that keeping track of a large number of amplitudes $A_i$ may impose an undue memory and/or computational burden on computing circuit 49. This may be eased by employing a time-weighted average using a simple analog integration circuit for circuit 49. Thus, additional statistical techniques, such as weighting, can be used to further adjust mean [A] and derive a weighted average. A person of average skill in the art will be able to determine proper sample size and averaging requirements based on the particular system and application. Diagram 140 shows that mean amplitude [A] is subtracted from $A_i$ simply by A.C. coupling the detected peak value to stage 112. This method obviates the need of special computation to obtain mean amplitude [A].

Finally, feedback circuit 48 uses fractional fluctuation $\Delta A_i$ of pulse i to derive a proper signal for driver circuit 24, which controls diode 22. In particular, feedback circuit 48 computes a signal to control driver circuit 24 such that it generates diode current $I_{i+1}$ preceding the subsequent pulse i+1. The calculation is based on a mean diode current [I] which is derived from the previous diode currents $I_i$ corresponding to pulses i. Mean diode current [I] can be computed according to any well-known statistical techniques as a total, moving or weighted average of diode currents $I_i$.

Based on mean diode current [I] and diode current $I_{i+1}$, which produces pulse i+1, feedback circuit 48 defines a fractional adjustment current $\Delta I_{i+1}$ as follows:

$$\Delta I_{i+1} = ((I_{i+1}) - [I])/[I].$$

Now, to reduce energy fluctuations and ensure pulse-to-pulse stability from pulse i to next pulse i+1, diode current $I_{i+1}$ has to be adjusted by adjustment current $\Delta I_{i+1}$. Consequently, the signal generated and sent by feedback circuit 48 to driver circuit 24 must induce the latter to produce a diode current expressed as:

$$I_{i+1} = [I] + \Delta I_{i+1}[I]$$

Diode current $I_{i+1}$ of this magnitude delivered to diode 22 for pumping medium 20 will ensure that pulse i+1 has the same or nearly the same peak amplitude $A_{i+1}$ as mean peak amplitude [A]. The following linear relationship between adjustment current $\Delta I_{i+1}$ and $\Delta A_i$ is established:

$$\Delta I_{i+1} = c \Delta A_i,$$

where c is the proportionality constant. This means that feedback circuit 48 can directly compute the adjustment current $\Delta I_{i+1}[I]$ which driver circuit 24 must add to diode current $I_{i+1}$ based on the value of $\Delta A_i$. Of course, the value of constant c has to be known to perform this calculation. At the present repetition rate v the optimal results are achieved with c=0.45.

In contrast, the following are observed at different value of c:
a) c>0.7 pulse-to-pulse amplitude oscillation
b) 0.6<c<0.7 increasing noise
c) 0.3<c<0.6 system stability improves
d) c<0.3 no apparent improvement Varying the pulse repetition rate v changes the optimal value of constant c. In fact, as a function of repetition rate the optimal value of c was determined to be in the range $0.36 \leq c \leq 0.4$. Given this information and the above relationships a person of average skill in the art will be able to optimize the value of c for any given pulse repetition rate v and system 10.

Alternatively, circuitry 40 is adapted to cooperate with integrator 44 which integrates pulse energies $E_i$ and the same feedback technique to adjust diode current $I_{i+1}$. In other words, circuitry 40 computes from pulse energies $E_i$ of pulses i a mean pulse energy [E]. This operation is performed by computing circuit 49 which receives energy values from integrator detector 44.

Feedback circuit 48 derives from mean pulse energy [E] a fractional fluctuation $\Delta E_i$ for any given pulse energy, in this case for energy $E_i$ of pulse i, expressed as:

$$\Delta E_i = ((E_i) - [E])/[E].$$

Mean energy [E] is calculated from previous energies $E_i$ or from a sample of q selected pulses. Feedback circuit 48 uses fractional fluctuation $\Delta E_i$ of pulse i to derive a proper signal for driver circuit 24, which controls diode 22. The derivation is analogous to the one for peak pulse amplitudes $A_i$. Thus, driver circuit 24 produces a diode current expressed as:

$$I_{i+1} = I_i + \Delta I_{i+1}[I]$$

or:

$$I_{i+1} = [I] + \Delta I_{i+1}[I]$$

Diode current $I_{i+1}$ of this magnitude delivered to diode 22 for pumping medium 20 will ensure that pulse i+1 has the same or nearly the same pulse energy $E_{i+1}$ as mean pulse energy [E]. Once again, the following linear relationship between adjustment current $\Delta I_{i+1}$ and $\Delta E_i$ is established:

$$\Delta I_{i+1} = c \Delta E_i,$$

where c is the proportionality constant. The value of constant c has to be known to perform this calculation. Fortunately, c can be determined as described above. The actual value for c, since the selected pulse magnitudes $M_i$ are the pulse energies $E_i$, will vary from the case in which pulse magnitudes $M_i$ are pulse amplitudes $A_i$. The optimal value of c should be determined empirically for any given system and it will depend on the repetition rate ν.

The above examples show how the adjustment of diode currents $I_i$ can be generalized with reference to any pulse magnitudes $M_i$ which vary as pulse amplitude or pulse energy. First, a fractional fluctuation of magnitude $M_i$ of pulse i is defined as:

$$\Delta M_i = ((M_i) - [M])/[M].$$

Then, the linear relationship between adjustment current $\Delta I_{i+1}$ and $\Delta M_i$ defined by:

$$\Delta I_{i+1} = c \Delta M_i,$$

is used with an empirically determined value of constant c to adjust next diode current $I_{i+1}$.

In fact, with the proper selection of constant c pulse widths $w_i$ can also be used in the feedback process. However, it should be noted that the variation of pulse widths $w_i$ is opposite from that of pulse energies $E_i$ or pulse amplitudes $A_i$. In other words, the higher the pulse energies $E_i$ the narrower pulse widths $w_i$ and vice versa (see FIG. 2 pulses i+2 and i+3). Therefore, a negative sign has to be added on the left side of the above equation when adjustment current $\Delta I_{i+1}$ is computed based on pulse widths $w_i$ ($\Delta I_{i+1} = -c\Delta M_i$ for $M_i = w_i$).

The pulse-to-pulse stability achieved by the method of invention will be better appreciated by reviewing how diode current $I_{i+1}$ affects pulse i+1 in the absence of feedback adjustment. This situation is shown in FIG. 2. Two pulses i and i+1 occur at times $\tau_r$ and $2\tau_r$, i.e., pulse i+1 follows pulse i after time $\tau_r$. Therefore, by definition, repetition rate ν is $1/\tau_r$. The dashed line represents mean peak pulse amplitude [A] or the desired, stable pulse-to-pulse value. Fluctuations $\Delta A_i$ and $\Delta A_{i+1}$ are also indicated. It is important to remember that pulse i is produced after current $I_i$ is applied to diode 22 and pulse i+1 is generated after current $I_{i+1}$. In the absence of feedback amplitudes $A_i$ and $A_{i+1}$ vary within a wide range delimited by an upper bound $A_{max}$ and a lower bound $A_{min}$.

FIG. 2 also shows pulses i+2 and i+3. From observing all four pulses i . . . i+3 one recognizes a tendency of amplitudes $A_i$ . . . i+3 of pulses i . . . i+3 to alternate between above and below mean [A]. This fact is very important to the invention and is addressed in detail below. The energies $E_{i+2}$ and $E_{i+3}$ of pulses i+2 and i+3 are the areas under the curves, as indicated by the hatching. Widths $w_{i+2}$ and $w_{i+3}$ exhibit a counter-variance with pulse amplitude, specifically, the higher the amplitude the narrower the width. As a result, the fluctuation in pulse energy is smaller than the fluctuation in amplitude. Thus, pulse-to-pulse energy stability experiences less variation than pulse-to-pulse peak power or peak pulse amplitude fluctuation ($\Delta A_i$). To stabilize both pulse-to-pulse energy stability and peak pulse amplitude, it is therefore most convenient to concentrate on stabilizing pulse-to-pulse peak pulse amplitude.

THEORY REVIEW

The reasons for the uncontrolled fluctuations as illustrated in FIG. 2 are directly related to the theory of high frequency Q-switched lasers. A brief overview of the fundamentals is offered at this point to better explain why system 10 is capable of achieving pulse-to-pulse stability by adjusting diode currents $I_i$ as derived according to the above method.

When Q-switched laser 12 is continuously pumped the mean energy per pulse E(ν) as a function of repetition rate ν is approximately equal to:

$$E(\nu) = E_o(1 - e^{-1/\nu\tau}), \quad (1)$$

where $E_o$ is the limit of energy per pulse i when ν approaches zero (ν→0) and effective storage time τ of laser medium 20 is practically defined as a constant that best empirically fits equation (1). Clearly, in FIG. 2 the energy of each pulse is calculated as $E(1/\tau_r) = E_o(1-e^{-\tau_r/\tau})$. This equation gives the most accurate results when no significant repetition-rate dependent processes, e.g., two-photon de-excitation, occur in medium 20. These types of processes depend on the energy stored in medium 20 or thermal lensing in the gain region within medium 20, which in turn depend on the extraction of energy from medium 20 as a function of repetition rate ν. With proper choice of medium 20 effective storage time τ is in theory equal to the fluorescence lifetime $\tau_f$ of medium 20. In practice, in many laser diode pumped solid state lasers such as (but not limited to) Q-switched Nd:YAG, Nd:YLF, Nd:YVO$_4$ and Nd:glass τ is close to $\tau_f$ if the pumping is not strong. Even if strongly pumped, the best fit value for τ is still often between 50% and 100% of $\tau_f$.

System 10 is designed to operate at repetition rate ν on the order of or greater than the inverse effective storage time 1/τ. In fact, repetition rate ν at which system 10 works best should be kept at a constant value greater than or equal to 0.5/τ when the stabilization process is in operation. The ν≧0.5/τ regime is frequently referred to as the high repetition range and the area for which ν≦0.5/τ is the low repetition range. Indeed, system 10 can operate far into in the high repetition range, i.e., even when ν>>0.5/τ. The limit in any particular case can be ascertained empirically.

As pointed out in FIG. 2, at high repetition rates (especially in the ν≧0.5/τ regime), if for any reason the magnitude $M_i$ of pulse i deviates from mean [M], e.g., the amplitude $A_i$ deviates from mean amplitude [A] or the energy $E_i$ deviates from mean energy [E], then pulse i+1 will on a statistical average have a deviation from mean [M] of the opposite sign from that of pulse i. This unexpected anti-correlation is due to the processes taking place inside medium 20. At the peak of pulse i the derivative of the power vs. time curve is flat by definition. Therefore at the time when pulse i attains peak power (peak pulse amplitude $A_i$) cavity 14 is operating at threshold; gain equals loss. For the remainder of pulse i, while the energy in cavity's 14 optical mode(s) emerges from cavity 14, some additional energy is extracted from medium 20 by stimulated emission. This pushes laser 12 below threshold. The larger pulse i the more medium 20 will drop below threshold. At repetition rates ν≧0.5/τ some of this energy depletion is maintained in medium 20 into the time of next pulse i+1. In other words, the influence of one pulse upon the next increases at higher repetition rates. The energy depletion is then superimposed upon the population newly pumped by pumping energy $E_{pump}$. Consequently, the magnitude $M_{i+1}$ of pulse i+1 will tend to be smaller than average [M] (peak amplitude $A_{i+1}$<[A]) if magnitude $M_i$ of pulse i was larger than average [M] (peak amplitude $A_i$>[A]). Similarly, the magnitude $M_{i+3}$ of pulse i+3 is smaller than average [M] (energy $E_{i+3}$<[E]) since magnitude $M_{i+2}$ of pulse i+2 was larger than average [M] ($E_{i+2}$>[E]); as shown in FIG. 2. Meanwhile, pulse i+2 tends to be larger than average because pulse i+1 was below average.

The "alternating effect" occurs unless there is strong saturation of the upper levels in medium 20. This condition is not common. Although any particular alternating sequence damps out over time, the alternating effect contributes to the pulse-to-pulse energy variability and pulse-to-pulse peak power stability. As pointed out above, these two parameters are positively correlated, meaning that a pulse with greater (or lesser) peak power generally has greater (or lesser) energy.

There are other effects that influence pulse-to-pulse energy variability. An important effect is related to variations in the mode structure inside cavity 14. Often more than one transverse mode should be avoided in favor of single transverse mode operation. Other sources of pulse-to-pulse energy variability include, but are not limited to, changes in the amount of pumping energy $E_{pump}$ stored in medium 20 between pulses, changes in the alignment of cavity 14 due to vibrations associated with cooling the laser or other processes, or changes in the dynamics of Q-switch 26.

OPERATION OF THE PREFERRED EMBODIMENT

When system 10 is in operation pumping energy $E_{pump}$ is delivered to medium 20 in the form of electromagnetic radiation from diode 22. In fact, diode current $I_i$ is a direct measure of radiant energy $E_{pump}$ delivered to medium 20. Thus, adjustments to diode currents $I_i$ translate directly into adjustments to pumping energy $E_{pump}$. Adjustment current $\Delta I_{i+1}$, calculated as $\Delta I_{i+1} = c\Delta M_i$, therefore represents a corresponding adjustment to pumping energy $E_{pump}$. In performing the feedback functions described above, feedback mechanism 48 increases pumping energy $E_{pump}$ when pulse magnitude $M_i$ of pulse i exceeds mean magnitude [M] and decreases pumping energy $E_{pump}$ when pulse magnitude $M_i$ of pulse i is less than mean magnitude [M].

Figure 3:
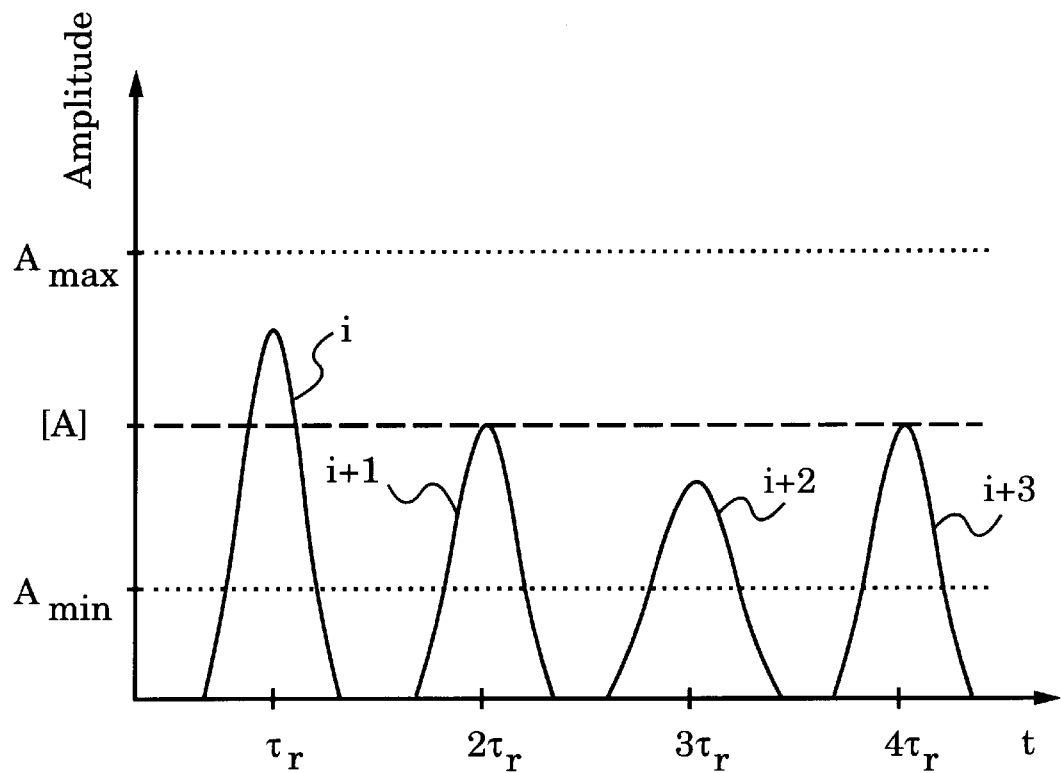
FIG. 3 is a graphical illustration of the pulse-to-pulse energy and peak power variation reduction achieved by the invention.

The result of this adjustment process is shown in FIG. 3 on a sequence of four pulses i ... i+3 at repetition rate $\nu=1/\tau_r$ significantly higher than $1/\tau$. All calculations are performed according to the method of invention and magnitudes $M_i$ are selected to be pulse amplitudes $A_i$. The mean pulse amplitude [A] is known.

First pulse i produced after diode current $I_i$ is above mean [A] as measured by deviation in peak amplitude $\Delta A_i$ and thus $I_{i+1}$ is increased by adjustment current $\Delta I_{i+1}$. This causes pulse i+1 to peak at or close to mean [A]. Pulse i+2, which is produced after diode current $I_{i+2}$, is below mean [A] and thus pumping current $I_{i+3}$ is decreased by adjustment current $\Delta I_{i+3}$. As a result, peak amplitude $A_{i+3}$ of pulse i+3 is at or closer to the value of mean [A].

Figure 6:
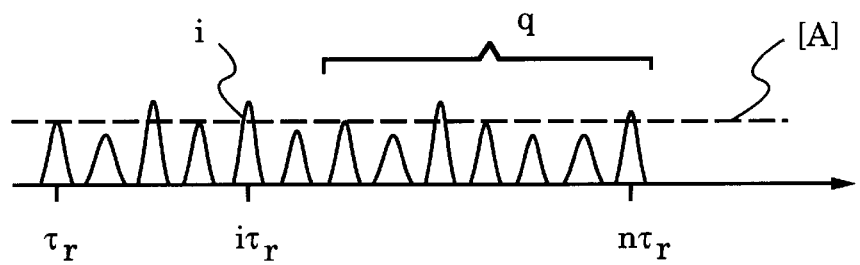
FIG. 6 is a diagram showing a method for averaging pulse energies according to the invention.

In practice, system 10 will stabilize a large number of pulses, as shown in FIG. 6. The repetition rate $\nu$ in this case is constant and equal to $1/\tau_r$ where $\tau_r<<\tau$. A number q of pulses i is used to compute mean amplitude [A] as a moving average. Number q can range from a few pulses, or even just one, to a statistically significant number. At start-up q should be small because system 10 will exhibit transience. Once steady-state operation is achieved a large sample of pulses is preferred.

Although system 10 and the method of invention are not capable of removing all variability in pulse-to-pulse peak power and energy stability, both figures are significantly improved. For example, when laser 12 operates at a pulse frequency of 32 kHz ($\tau_r=\mu sec$) and $\tau \approx 0.4$ msec so that $\tau_r<<\tau$ and $\nu=1/\tau_r>>1/\tau$ the typical maximum values for $\Delta A_i$ are ±7.5% and the typical maximum values for $\Delta I_i$ are ±3.45%. In general, the invention produces an improvement of 20% to 50% in pulse-to-pulse energy stability. However, optimization of system parameters and feedback computations can further improve these figures.

System 10 and method of the invention reduce the pulse-to-pulse peak power and energy variation in pulsed laser 12 operating in the high repetition rate regime ($\nu \approx 1/\tau$) at constant and slowly varying repetition rates $\nu$. System 10 is simple and cost-effective to implement in many different types of lasers, such as solid state, gas and liquid lasers.

OTHER EMBODIMENTS

Figure 7:
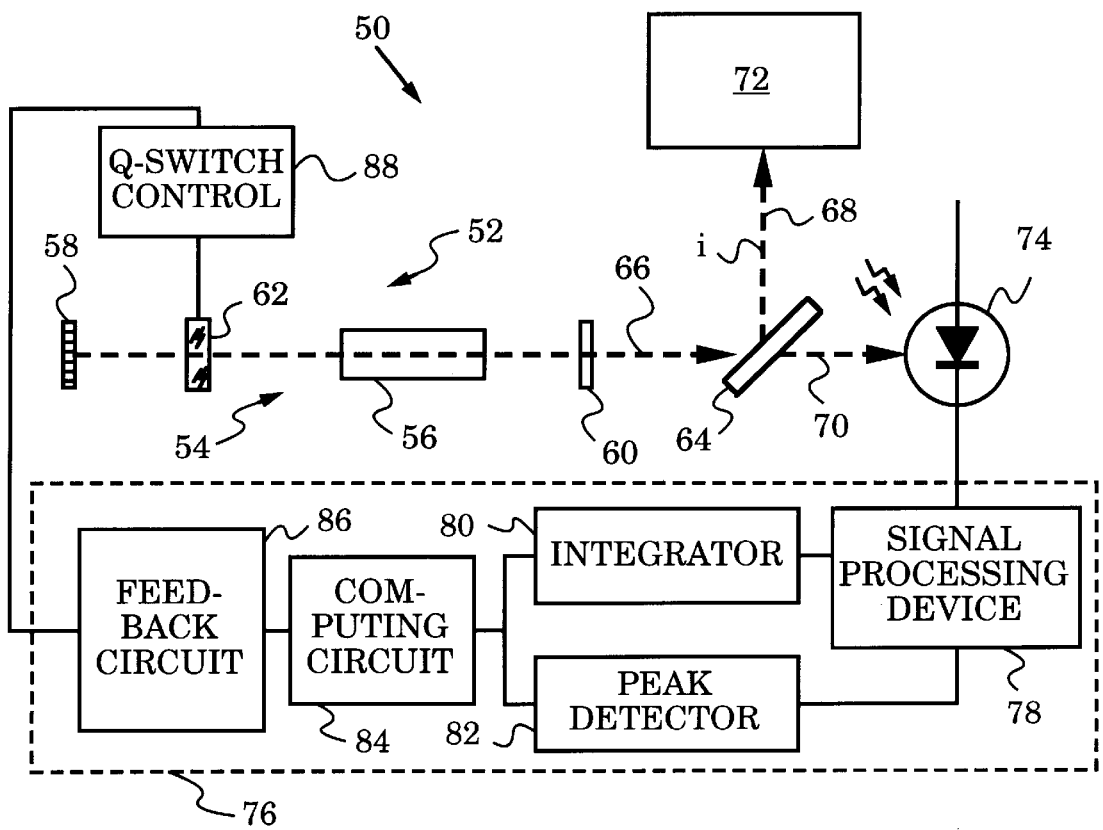
FIG. 7 is a block diagram of another system according to the invention.

Another system 50 according to the invention is shown in FIG. 7. System 50 has a laser 52 with a medium 56 positioned inside lasing cavity 54 formed between a high reflector 58 and an output coupler 60. A Q-switch 62 is located inside cavity 54 as well. Although no pumping mechanism is shown, it is understood that medium 56 is pumped by a mechanism for supplying pumping energy $E_{pump}$. In fact, pumping may be obtained through optical or electrical pumping in any of the permissible geometries.

A beam splitting element 64 is located outside cavity 54 to divide output beam 66 consisting of pulses i into a working beam 68 and a test beam 70. Working beam 68 is deflected to a working area 72 and test beam 70 is incident on a photodetector 74. Working area 72 can be a material processing bench set up to perform tasks such as trimming, annealing, surface texturing, cutting, welding or melting. Working area 72 can also contain arrangements for photodepositing, photodissociating, photo-polymerization and surgical procedures.

Photodetector 74 intercepts test beam 70 and generates a response signal indicative of the amplitude of each pulse i. The output of photodetector 74 is connected to a control circuitry 76. Circuitry 76 has a signal processing device 78, an integrator 80 and/or a peak detector 82, a computing circuit 84 and a feedback circuit 86 interconnected as indicated in FIG. 7. The output of feedback circuit 86 is connected to a Q-switch control mechanism 88 which varies the loss of Q-switch 62 to induce the emission of pulses i.

During operation pulses i from laser 52 are converted by photodetector 74 to electrical signals indicative of the amplitudes $A_i$ of pulses i. The components of circuitry 76 use amplitudes $A_i$ to derive a mean peak pulse amplitude [A] fluctuation $\Delta A_i$ for any given pulse amplitude. Then feedback circuit 86 uses fluctuation $\Delta A_i$ of pulse i to derive a proper signal for Q-switch control 88, which regulates the loss factor of Q-switch 62. In particular, feedback circuit 88 computes a signal for Q-switch control 88 to decrease the variable loss factor when pulse amplitude $A_i$ of laser pulse i exceeds mean [A] and to increase the variable loss factor when pulse amplitude $A_i$ is less than mean [A].

In this embodiment Q-switch 62 is an electro-optic or acousto-optic device and is controlled by switch voltages from Q-switch control 88 to produce switch losses $S_i$. An adjustment switch loss $\Delta S_{i+1}$ is computed in a manner analogous to adjustment current $\Delta I_{i+1}$ and added to the previous switch loss $S_i$. The new relation for determining adjustment switch loss is:

$$\Delta S_{i+1} = -c\Delta A_i,$$

where c is the proportionality constant. The negative sign is due to the fact that the variable loss factor has to be decreased when pulse amplitude $A_i$ exceeds [A], and vice versa. This means that feedback circuit 86 can directly compute the adjustment switch loss $\Delta S_{i+1}$ which Q-switch control 88 must add to switch loss $S_{i+1}$ based on the value of $\Delta A_i$. Of course, the value of constant c has to be known to perform this calculation. This value can be determined empirically and depends on the parameters of system 50. The same concept applies to any kind of loss inducing device in the cavity including, but not limited to, all forms of Q-switches.

The results obtained with system 50 are analogous to those achieved with system 10. The fact that system 50 achieves pulse-to-pulse energy and peak stability by controlling Q-switch 62 is advantageous in situations where the pumping mechanism cannot be actively controlled.

Figure 8:
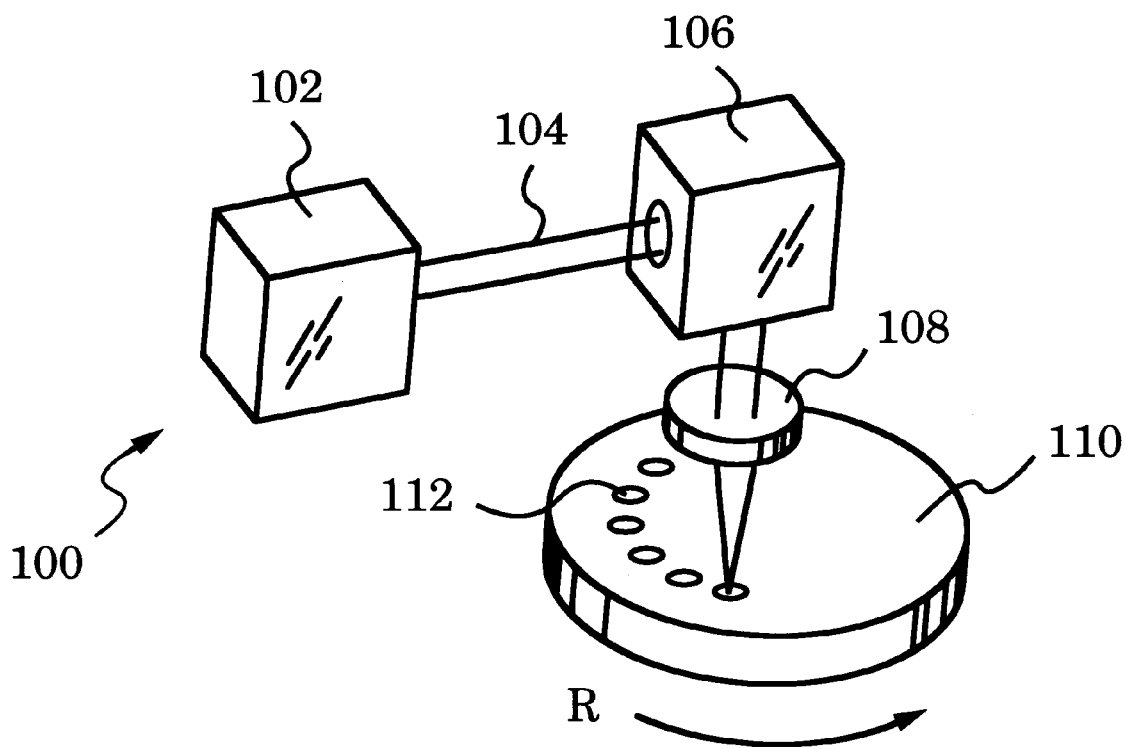
FIG. 8 is a three dimensional illustration of an application of the system of the invention.

FIG. 8 shows an application for a system 100 according to the invention. In this case entire system 100 is contained inside housing 102. System 100 is either the preferred embodiment or an alternative embodiment of the invention.

A working beam 104 consisting of pulses i exits housing 102 and is guided by optics 106 and 108 to impinge on a rotating disc 110. In this case disc 110 is an optical disc which is processed for digital data storage by producing on its surface texture 112. Because of the pulse-to-pulse stability of energy and peak power, pulses i produce uniform and clean texture 112. In addition, because system 100 affords stability at higher repetition rates ν than conventional systems, the processing can be performed significantly faster.

The above application is only one of many where the invention can be used. In fact, any processing technique requiring high repetition, accurate laser pulses i can benefit from using the system and method of the invention. This will cover a vast number of applications, since virtually all materials processing methods are ultimately limited in speed by the laser's pulse-to-pulse stability.

It will be clear to one skilled in the art that the above embodiment may be altered in many ways without departing from the scope of the invention. For example, the system and method of the invention can be adapted for use with non-linear frequency conversion techniques either within the laser cavity, external to the cavity or both. This can be done in a straightforward manner to extend the operating range of the system. It is also possible to adjust the Q-switch and the pumping mechanism simultaneously to achieve better pulse-to-pulse stability. An embodiment capable of performing both feedback adjustment can be derived directly from the above embodiments.

Accordingly, the scope of the invention should be determined by the following claims and their legal equivalents.

What is claimed is:

1. A system for reducing the pulse-to-pulse energy variation in a pulsed laser, said system comprising:
   a) a laser cavity with a lasing medium positioned therein;
   b) a pumping means for delivering to said lasing medium a pumping energy $E_{pump}$;
   c) a switching means for inducing said lasing medium to emit laser pulses i;
   d) a detection means for determining pulse magnitudes $M_i$ of said laser pulses i; and
   e) a feedback means in communication with said pumping means for increasing said pumping energy $E_{pump}$ by an adjustment amount correlated to $c\Delta M_i$, where c is a proportionality constant, $\Delta M_i=((M_i)-[M])/[M]$ and $[M]$ is a mean pulse magnitude, when pulse magnitude $M_i$ of laser pulse i exceeds $[M]$, and for decreasing said pumping energy $E_{pump}$ by said adjustment amount when pulse magnitude $M_i$ of laser pulse i is less than $[M]$.

2. The system of claim 1 wherein said pulse magnitudes $M_i$ are the peak pulse amplitudes $A_i$ and said mean pulse magnitude $[M]$ is the mean pulse amplitude $[A]$.

3. The system of claim 1 wherein said pulse magnitudes $M_i$ are the pulse energies $E_i$ and said mean pulse magnitude $[M]$ is the mean pulse energy $[E]$.

4. The system of claim 1 further comprising a computing means in communication with said detection means for calculating said mean pulse magnitude $[M]$ from said pulse magnitude $M_i$.

5. The system of claim 1 wherein said switching means is a loss inducing means.

6. The system of claim 5 wherein said loss inducing means is a Q-switch.

7. The system of claim 1 wherein said detection means is a photodetector.

8. The system of claim 1 wherein said lasing medium is selected from the group consisting of Er:glass and Yb:YAG.

9. The system of claim 1 wherein said pumping means is a laser diode.

10. The system of claim 1 wherein said lasing medium is a neodymium doped solid state host.

11. The system of claim 10 wherein said neodymium doped solid state host is selected from the group of materials consisting of Nd:glass, Nd:YAG, Nd:YLF, Nd:YAP, Nd:YVO$_4$ and Nd:SFAP.

12. A system for reducing the pulse-to-pulse energy variation in a pulsed laser, said system comprising:
   a) a laser cavity with a lasing medium positioned therein;
   b) a pumping means for delivering to said lasing medium a pumping energy $E_{pump}$;
   c) a switching means for inducing said lasing medium to emit laser pulses I, said switching means having a variable loss factor;
   d) a detection means for determining pulse magnitudes $M_i$, of said laser pulses i; and
   e) a feedback means in communication with said pumping means for decreasing said variable loss factor by an adjustment amount correlated $c\Delta M_i$, where c is a proportionality constant, $\Delta M_i=((M_i)-[M])/[M]$ and $[M]$ is a mean pulse magnitude, when pulse magnitude $M_i$ of laser pulse i exceeds $[M]$, and for increasing said variable loss factor by said adjustment amount when pulse magnitude $M_i$ of laser pulse i is less than $[M]$.

13. The system of claim 12 wherein said pulse magnitudes $M_i$ are the peak pulse amplitudes $A_i$ and said mean pulse magnitude $[M]$ is the mean pulse amplitude $[A]$.

14. The system of claim 12 wherein said pulse magnitudes $M_i$ are the pulse energies $E_i$ and said mean pulse magnitude $[M]$ is the mean pulse energy $[E]$.

15. The system of claim 12 further comprising a computing means in communication with said detection means for calculating said mean pulse magnitude $[M]$ from said pulse magnitudes $M_i$.

16. The system of claim 12 wherein said switching means is a Q-switch.

17. The system of claim 12 wherein said detection means is a photodetector.

18. The system of claim 12 wherein said lasing medium is selected from the group consisting of Er:glass and Yb:YAG.

19. The system of claim 12 wherein said pumping means is a laser diode.

20. The system of claim 12 wherein said lasing medium is a neodymium doped solid state host.

21. The system of claim 20 wherein said neodymium doped solid state host is selected from the group of materials consisting of Nd:glass, Nd:YAG, Nd:YLF, Nd:YAP, Nd:YVO$_4$ and Nd:SFAP.

22. A method for reducing the pulse-to-pulse energy variation in a pulsed laser having a laser cavity with a lasing medium positioned therein, said method comprising the following steps:
   a) pumping said lasing medium with a pumping means by delivering to said lasing medium a pumping energy $E_{pump}$;
   b) inducing said lasing medium to emit laser pulses i by using a switching means;
   c) determining pulse magnitudes $M_i$ of said laser pulses i; and
   d) increasing said pumping energy $E_{pump}$ by an adjustment amount correlated to $c\Delta M_i$, where c is a proportionality constant, $\Delta M_i=((M_i)-[M]))/[M]$ and $[M]$ is a mean pulse magnitude, when pulse magnitude $M_i$ of laser pulse i exceeds $[M]$, and decreasing said pumping energy $E_{pump}$ by said adjustment amount when pulse magnitude $M_i$ of laser pulse i is less than $[M]$.

23. The method of claim 22 wherein said pulse magnitudes $M_i$ are the peak pulse amplitudes $A_i$ and said mean pulse magnitude $[M]$ is the mean pulse amplitude $[A]$.

24. The method of claim 22 wherein said pulse magnitudes $M_i$ are the pulse energies $E_i$ and said mean pulse magnitude $[M]$ is the mean pulse energy $[E]$.

25. The method of claim 22 further comprising the step of calculating said mean pulse magnitude $[M]$ from said pulse magnitudes $M_i$.

26. The method of claim 25 wherein said mean pulse magnitude $[M]$ is calculated from a pulse sample containing a number q of said laser pulses i, where $q \geq 1$.

27. The method of claim 25 wherein said mean pulse magnitude $[M]$ is calculated as a weighted average.

28. The method of claim 25 wherein said mean pulse magnitude $[M]$ is calculated as a moving average.

29. The method of claim 22 wherein said laser pulses i are emitted at a repetition rate $\nu$ on the order of or greater than the inverse effective storage time $1/\tau$ of said lasing medium.

30. The method of claim 29 wherein said repetition rate $\nu$ is constant.

31. The method of claim 29 wherein said repetition rate $\nu$ is greater than or equal to $0.5/\tau$.

32. The method of claim 22 wherein said pumping means is a laser diode and said pumping energy $E_{pump}$ for pumping said lasing medium to enable emission of said laser pulses i is delivered by applying corresponding diode currents $I_{i+1}$ to said laser diode.

33. The method of claim 32 wherein diode current $I_{i+1}$ is adjusted by a fractional adjustment current $\Delta I_{i+1}$.

34. The method of claim 33 wherein the fluctuation of pulse magnitude $M_i$ of pulse i from said mean pulse magnitude $[M]$ is $\Delta M_i$ and said fractional adjustment current $\Delta I_{i+1}$ is calculated from the equation $\Delta I_{i+1}=c\Delta M_i$, where c is a constant.

35. The method of claim 22 wherein said lasing medium emits at wavelengths ranging between 0.7 and 10 $\mu$m.

36. A method for reducing the pulse-to-pulse energy variation in a pulsed laser having a laser cavity with a lasing medium positioned therein, said method comprising the following steps:
   a) pumping said lasing medium with a pumping means by delivering to said lasing medium a pumping energy $E_{pump}$;
   b) inducing said lasing medium to emit laser pulses i by using a switching means having a variable loss factor;
   c) determining pulse magnitudes $M_i$ of said laser pulses i; and
   d) decreasing said variable loss factor by an adjustment amount correlated to $c\Delta M_i$, where c is a proportionality constant, $\Delta M_i=((M_i)-[M]))/[M]$ and $[M]$ is a mean pulse magnitude, when pulse magnitude $M_i$ of laser pulse i exceeds $[M]$, and increasing said variable loss factor by said adjustment amount when pulse magnitude $M_i$ of laser pulse i is less than $[M]$.

37. The method of claim 36 wherein said pulse magnitudes $M_i$ are the peak pulse amplitudes $A_i$ and said mean pulse magnitude $[M]$ is the mean pulse amplitude $[A]$.

38. The method of claim 36 wherein said pulse magnitudes $M_i$ are the pulse energies $E_i$ and said mean pulse magnitude $[M]$ is the mean pulse energy $[E]$.

39. The method of claim 36 further comprising the step of calculating said mean pulse magnitude $[M]$ from said pulse magnitudes $M_i$.

40. The method of claim 39 wherein said mean pulse magnitude $[M]$ is calculated from a pulse sample containing a number q of said laser pulses i, where $q \geq 1$.

41. The method of claim 39 wherein said mean pulse magnitude $[M]$ is calculated as a weighted average.

42. The method of claim 39 wherein said mean pulse magnitude $[M]$ is calculated as a moving average.

43. The method of claim 36 wherein said laser pulses i are emitted at a repetition rate $\nu$ on the order of or greater than the inverse effective storage time $1/\tau$ of said lasing medium.

44. The method of claim 43 wherein said repetition rate $\nu$ is constant.

45. The method of claim 43 wherein said repetition rate $\nu$ is greater than or equal to $0.5/\tau$.

46. The method of claim 36 wherein said lasing medium emits at wavelengths ranging between 0.7 and 10 $\mu$m.

* * * * *